UNITED STATES PATENT OFFICE.

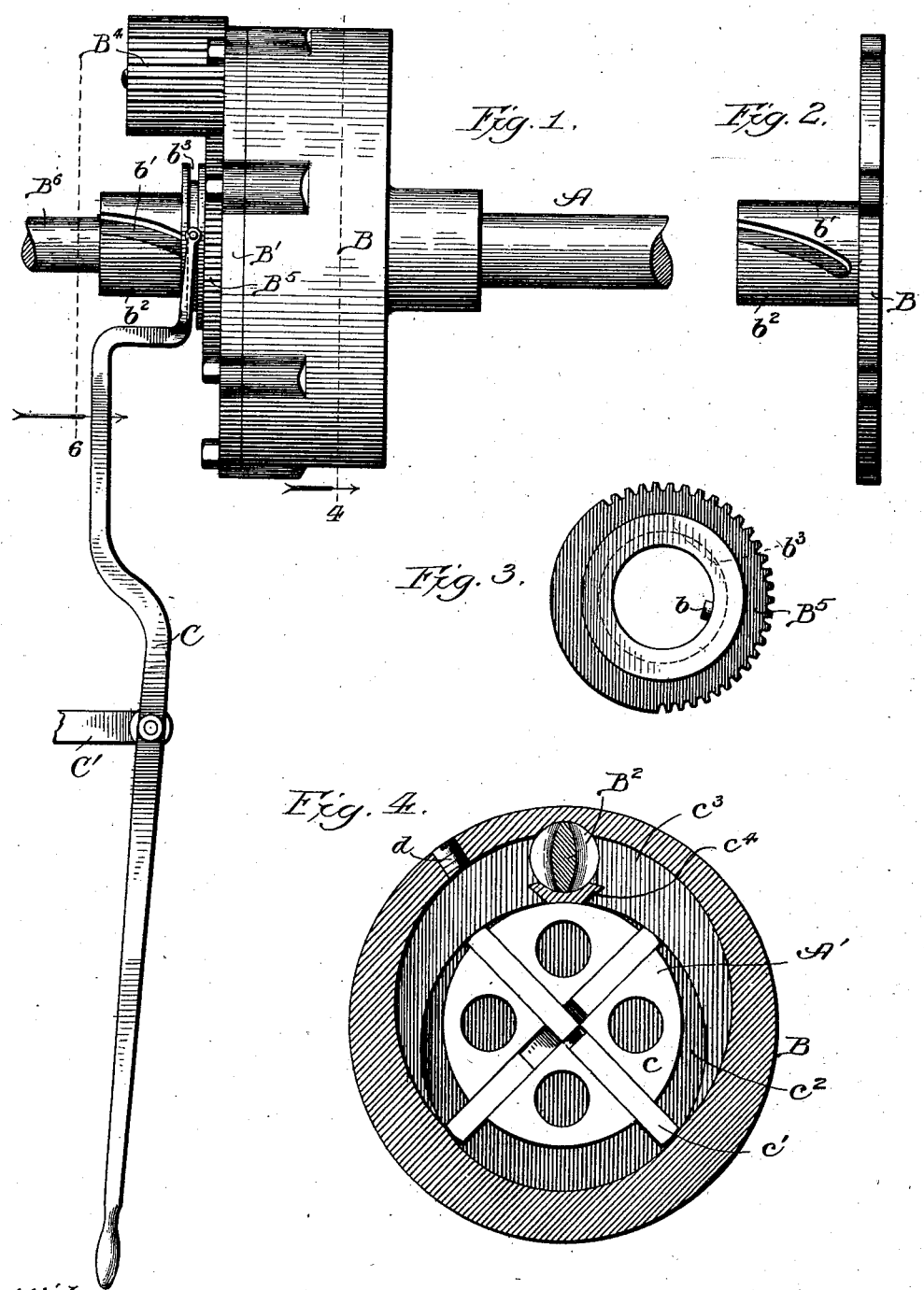

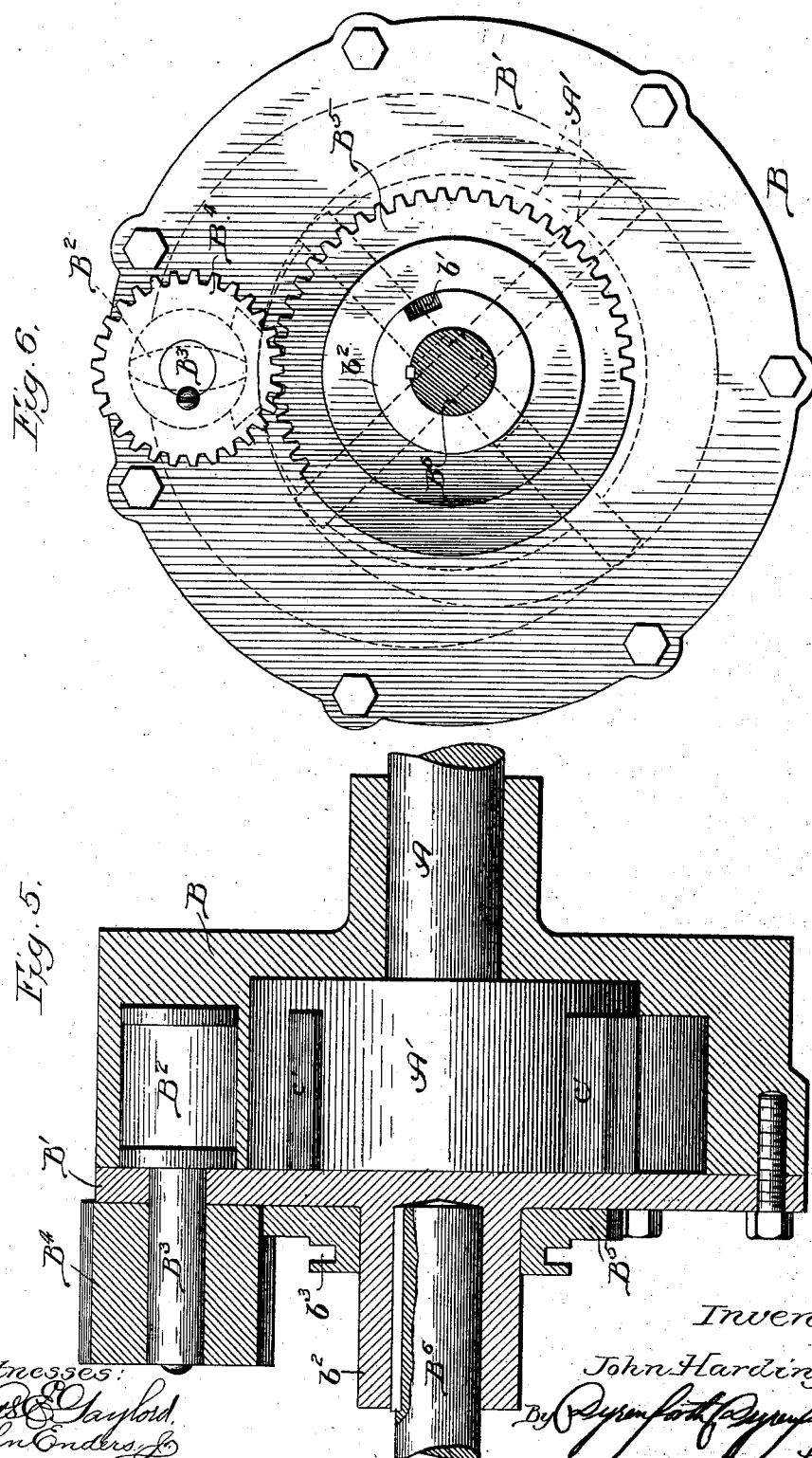

JOHN HARDING, JR., OF CHICAGO, ILLINOIS.

CLUTCH MECHANISM.

SPECIFICATION forming part of Letters Patent No. 693,271, dated February 11, 1902.

Application filed May 9, 1901. Serial No. 59,502. (No model.)

*To all whom it may concern:*

Be it known that I, JOHN HARDING, Jr., a citizen of the United States, residing at Chicago, in the county of Cook and State of Illinois, have invented a new and useful Improvement in Clutch Mechanism, of which the following is a specification.

My invention relates particularly to clutch mechanism in which liquid is employed as an agent for connecting a driving and a driven part.

My primary object is to provide clutch mechanism of this character of simple construction which may be employed in lieu of common friction or positive clutch mechanisms now in common use.

My invention is illustrated in its preferred form in the accompanying drawings, in which—

Figure 1 is a plan view showing my improved clutch mechanism; Fig. 2, an edge view of a removable plate for the casing employed; Fig. 3, a view of a gear-sector employed; Fig. 4, a section taken as indicated at line 4 of Fig. 1; Fig. 5, an enlarged section taken as indicated at line 5 of Fig. 1, and Fig. 6 an enlarged section taken as indicated at line 6 of Fig. 1.

A description of the preferred construction is as follows:

A represents a driving-shaft, which may be operated by any suitable engine or motor; A', a pump or fluid-circulating device fixed at one end of the shaft A; B, a casing for the pump A', the same being provided with a removable face-plate B'; $B^2$, a valve carried by the casing B and provided with a stem $B^3$, equipped with a pinion $B^4$; $B^5$, a gear-sector provided internally with a pin or stud $b$, which engages a spiral groove $b'$ on the external surface of a sleeve $b^2$, with which the plate B' is equipped, said gear-sector being itself equipped with a sleeve provided with a circumferential groove $b^3$; $B^6$, a shaft keyed to the sleeve $b^2$ of the plate B', and C a controlling-lever having a bifurcated head engaging the groove $b^3$ of the gear-sector $B^5$, said lever being pivoted on a stationary part C'.

The pump A' may be of any ordinary construction. It preferably comprises a rotary core $c$ and radial vanes $c'$, the core $c$ being placed eccentric to the bore $c^2$ of the cylinder B. The valve $B^2$ is located to control a channel or passage $c^3$, which communicates with the bore $c^2$ of the cylinder on opposite sides of an abutment $c^4$. For the purpose of permitting the ready introduction of liquid the casing B is provided with a removable plug $d$.

The operation will be readily understood. Assuming the pump-chamber and the channel $c^3$ to be filled with liquid and the valve $b^2$ to be in position to close the channel $c^3$, as illustrated in Fig. 4, application of power to the shaft A will produce rotation of the casing B by reason of the fact that no circulation of the liquid within the casing can take place. In this position of the valve the casing B will rotate with the same speed as does the shaft A. Should it be desired to reduce the speed of the casing, this may be accomplished by shifting the gear-sector $B^5$ through the medium of the lever C. When said gear-sector is shifted, the pin and spiral-groove connection between the sleeve $b^2$ and the gear-sector produces a partial rotation of the gear-sector on said sleeve. This imparts movement to the pinion $B^4$, with which the gear-sector meshes, and thereby operates the valve. The pinion $B^4$ is of sufficient width to engage the gear-sector at any portion of its traverse. When the valve $B^2$ is opened slightly, circulation of a small amount of liquid is provided for and the casing rotates more slowly than when the valve is closed. When the valve is completely opened, the liquid circulates freely through the channel $c^3$, and no motion is imparted to the casing.

It will be understood from the foregoing description that any desired rate of speed between that of the shaft A and *nil* may be imparted to the casing B and through its medium to its shaft $B^6$ by means of the construction described. It will be understood, also, that the speed of the casing B may be changed very gradually, so as to avoid all shock.

It is evident that instead of applying power to the shaft A and communicating motion through the same therefrom to the shaft $B^6$ through the medium of the casing power may be applied to the shaft $B^6$ and communicated therefrom to the shaft A through the medium of said casing. This may be accomplished without any change in the construction shown.

Changes in details of construction within the spirit of my invention may be made. Hence no limitation is to be understood from the foregoing detailed description, except as shall appear from the appended claim.

What I claim as new, and desire to secure by Letters Patent, is—

In clutch mechanism, the combination of a rotary shaft, a rotary pump carried thereby, a rotary casing provided with a pump-chamber and a fluid-circuit, a removable face-plate for said casing provided externally with a sleeve or hub having a spiral groove, a shiftable gear-sector mounted on said hub and having groove-engaging means, a valve controlling said circuit and equipped with a pinion engaging said gear-sector and means for shifting said gear-sector, substantially as described.

JOHN HARDING, Jr.

In presence of—
D. W. LEE,
ALBERT D. BACCI.